(12) United States Patent
Williston

(10) Patent No.: US 6,932,164 B1
(45) Date of Patent: Aug. 23, 2005

(54) DOUBLE-HEADED TENT STAKE DRIVER AND PULLER

(75) Inventor: Christopher A. Williston, Bitburg (DE)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 10/632,075

(22) Filed: Aug. 1, 2003

(51) Int. Cl.[7] ................................................ B25D 1/16
(52) U.S. Cl. ........................ 173/90; 173/92; 173/128; 173/132
(58) Field of Search ............................ 173/90, 92, 128, 173/132; 254/18; 403/294, 315, 316, 317, 403/354, 376, 378; 29/254

(56) References Cited

U.S. PATENT DOCUMENTS

| | | | |
|---|---|---|---|
| 846,389 A * | 3/1907 | Blackburn | .................. 403/108 |
| 3,739,452 A | 6/1973 | Gadberry | |
| 4,185,937 A * | 1/1980 | Anderson | ................... 403/316 |
| 4,329,078 A * | 5/1982 | Crates et al. | ................ 403/316 |
| 4,485,956 A | 12/1984 | van Iperen | |
| 4,720,904 A | 1/1988 | Palla, Jr. | |
| 4,971,474 A * | 11/1990 | Sprague | ...................... 403/331 |
| 4,986,690 A * | 1/1991 | Cooksey | ..................... 403/319 |
| 4,995,768 A * | 2/1991 | Craft | ..................... 408/239 A |
| 5,085,281 A * | 2/1992 | Selly | ........................... 173/91 |
| 5,113,687 A | 5/1992 | Palmgren | |
| 5,632,568 A * | 5/1997 | Fechter | ....................... 403/328 |
| 5,647,686 A * | 7/1997 | Hancock et al. | ............ 403/373 |
| 5,694,672 A | 12/1997 | Perin | |
| 5,984,272 A | 11/1999 | Crider | |

OTHER PUBLICATIONS

Christopher A. Williston, Copending, Commonly Assigned Patent Application: "Double-headed Tent Stake Driver and Puller Having Twin Release Levers", AFD 626T, Filed on Even Date.

* cited by examiner

Primary Examiner—Rinaldi I. Rada
Assistant Examiner—Chukwurah Nathaniel
(74) Attorney, Agent, or Firm—AFMCLO/JAZ; Richard A. Lambert

(57) ABSTRACT

A double-headed tent stake driver and puller is provided for inserting and removing tent stakes, nails and the like. The double-headed tent stake driver and puller includes a slide hammer and a coupler mounted on the distal end of the slide hammer shaft. The coupler has an elongate body with an open end and a hollow core sized to receive the head of the stake or nail intended for use with the present invention. The coupler includes a retractable keeper slidably received within. The keeper provides the twofold benefits of retaining the stake once inserted into the coupler, and presenting a surface for imparting the extraction force upon a stake to be pulled from the ground. The keeper is urged to its closed position by a spring.

4 Claims, 4 Drawing Sheets

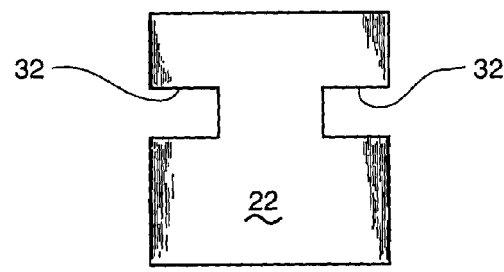
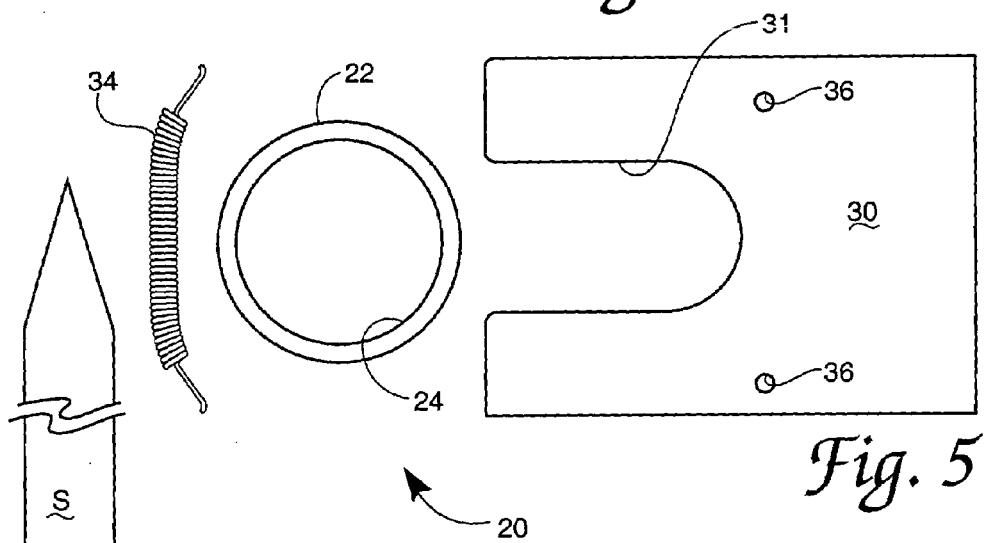
Fig. 4
Fig. 5
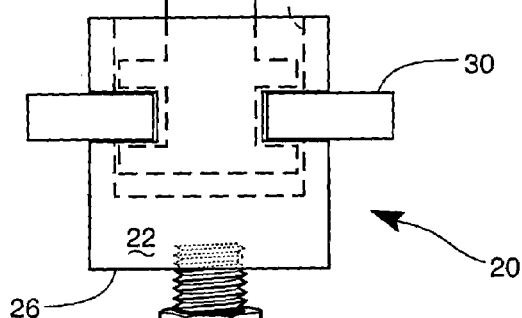
Fig. 6

US 6,932,164 B1

DOUBLE-HEADED TENT STAKE DRIVER AND PULLER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to extraction devices and more particularly to a double-headed tent stake driver and puller for use with a slide hammer.

This application is related to my copending and commonly assigned patent application "DOUBLE-HEADED TENT STAKE DRIVER AND PULLER HAVING TWIN RELEASE LEVERS" filed on even date herewith.

The utility of tents for providing temporary as well as permanent shelter is well known. Tents are available in a wide variety of sizes and configurations and are extensively used by the armed forces, for example, in areas where the construction of permanent shelter is not deemed practicable or desirable. While tent design varies, most tents utilize stakes driven into the ground to anchor the tent in place.

The design of tent stakes varies widely as well, but many stakes are, in essence, large, double-headed nails. In use, the stakes are driven into the ground, typically by the use of a sledge or pneumatic hammer, and the tent stays or cords are attached thereto to anchor the tent. When it is desired to lower the tent, the stake is pulled from the ground by a pry bar placed under the upper head of the stake.

This method of driving and pulling tent stakes, while effective, leaves much to be desired. For example, use of a sledge hammer often damages the stake or adjacent tent rails because sledge hammers are hard to control, especially when used by inexperienced personnel or in situations where the ground to be penetrated is hard, necessitating the use of great force. Personnel safety is also a concern since the swing of a sledge hammer requires a large space, and inattentive passersby can be severely injured. Moreover, the use of a pry bar for extraction of the stake is often disadvantageous because the stakes are easily bent or damaged because the extraction forces imparted upon the stake by the pry bar are curvilinear. Adjacent tent rails are easily damaged as well since the pry bar must be leveraged against a solid object and sometimes the rails are in the way of the pry bar.

A need exists therefore for an improved tool for use in driving and pulling double-headed tent stakes and the like. Such a tool would be lightweight, compact and easy to carry and use.

SUMMARY OF THE INVENTION

Accordingly, it is a primary object of the present invention to provide a double-headed tent stake driver and puller overcoming the limitations and disadvantages of the prior art.

Another object of the present invention is to provide a double-headed tent stake driver and puller that incorporates a slide hammer for a compact, effective driving and pulling action.

Still another object of the present invention is to provide a coupler for attachment to a slide hammer that includes a keeper for retaining the head of a tent stake or nail to exert both driving and pulling forces thereon.

These and other objects of the invention will become apparent as the description of the representative embodiments proceeds.

In accordance with the foregoing principles and objects of the invention, a double-headed tent stake driver and puller is provided to install and extract double-headed tent stakes and the like. The invention has particular utility on double-headed stakes and nails wherein the second head extends a distance from the material surface, providing a ready gripping surface.

The double-headed tent stake driver and puller of the present invention includes a coupler for attachment to a slide hammer. The coupler has an elongate body with a hollow core sized to receive the head of the stake or nail intended for use with the present invention. The coupler has first and second ends. The first end is closed and is attached to the shaft of the slide hammer. The second end is open, for receipt of the stake or nail. The coupler also includes a pair of parallel grooves machined in the body and aligned orthogonally to the longitudinal axis.

Advantageously and according to an important aspect of the present invention, a spring loaded keeper is slidably received within the grooves, positionable between an open and closed position. The keeper provides the twofold benefits of retaining the stake once inserted into the tool, and providing a surface for imparting the extraction force upon the head of the stake to be pulled from the ground. The keeper is urged to its closed position by the spring. In use, the user pulls the keeper outwardly, to the open position, and the head of the stake is inserted. When the stake is fully inserted, the keeper is released and, by virtue of the spring, retracts to the closed position, retaining the head of the stake.

As stated, the keeper exerts an upward force on the underside of the stake head during use, thereby providing the pulling force. Conversely, the closed end of the coupler provides a surface for imparting the driving force when insertion into the ground is desired. In this way, the double-headed tent stake driver and puller of the present invention can be used to both drive tent stakes into the ground as well as remove them. The slide hammer is compact, enhancing safety and simplicity, and imparts direct, linear forces to the stake, enabling the stakes to be installed in close proximity and removed without bending.

As can be seen, the double-headed tent stake driver and puller of the present invention presents a dramatic advance over the apparatuses and methods of the prior art by not only simplifying and improving operation but by a significant reduction in cost incurred from damage to the stakes from insertion and removal by the prior art methods as well as the expensive components the stake secures.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 4 is an elevational view of the elongate body of the coupler of the double-headed tent stake driver and puller of the present invention;

FIG. 5 is an exploded view of the coupler of the double-headed tent stake driver and puller of the present invention;

FIG. 6 is an elevational view of the coupler of the double-headed tent stake driver and puller of the present invention showing a double-headed tent stake in phantom received within the coupler.

DETAILED DESCRIPTION OF THE INVENTION

Figure 1:
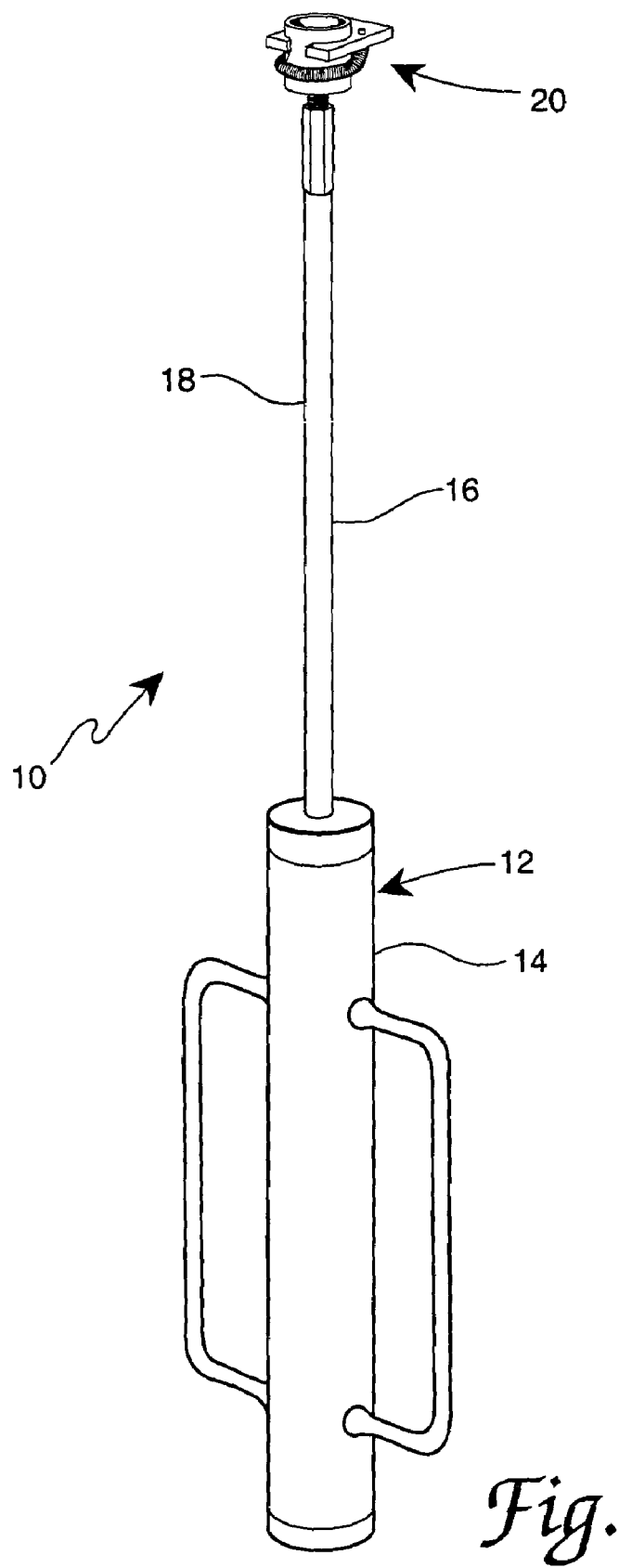
FIG. 1 is a perspective view of the double-headed tent stake driver and puller of the present invention.

Reference is now made to the drawing figures illustrating the double-headed tent stake driver and puller 10 of the present invention. The double-headed tent stake driver and puller can be effectively used to drive tent stakes into the ground and remove them. The double-headed tent stake driver and puller is, lightweight, compact and easy to carry and use.

Figure 2:
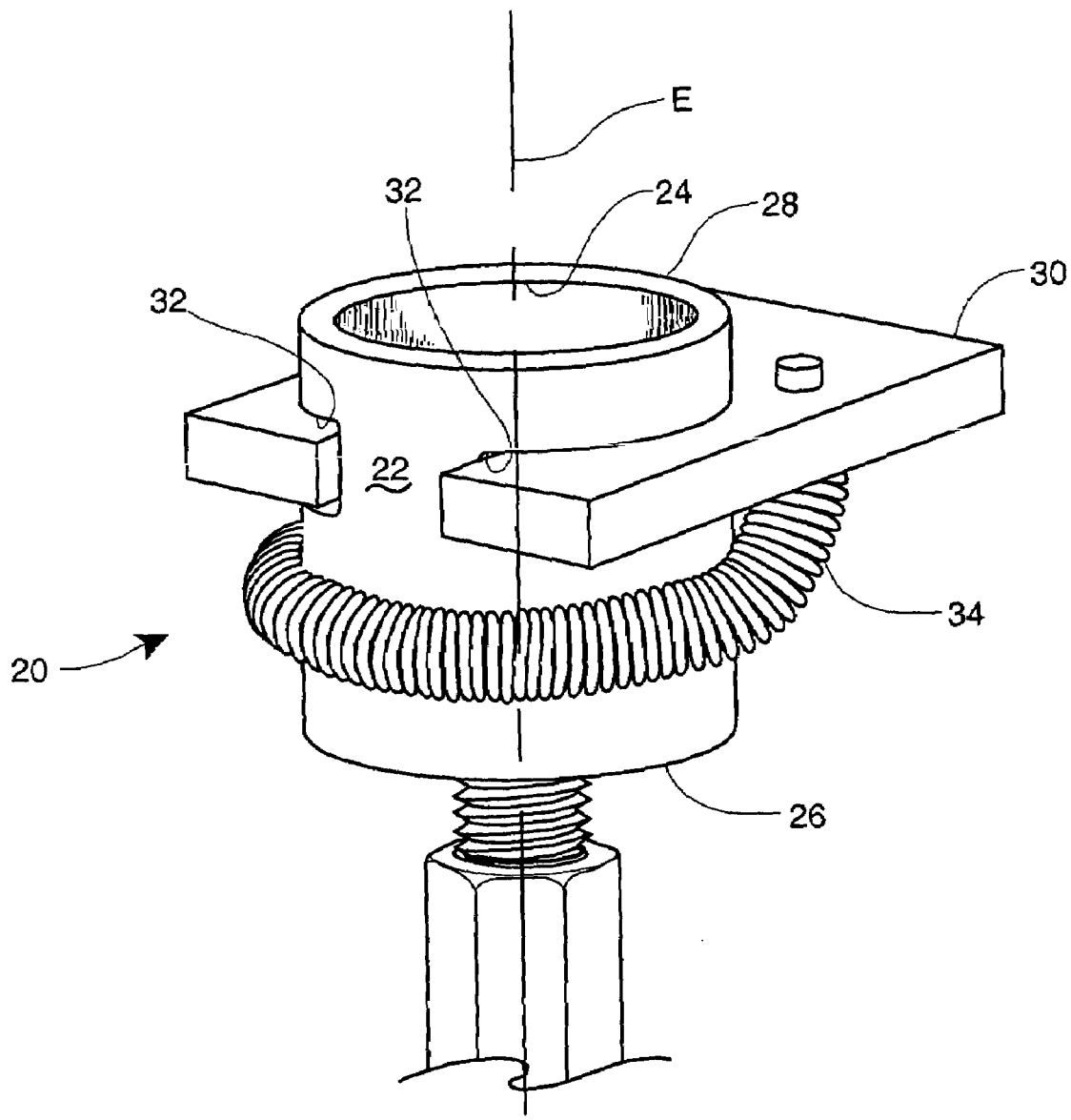
FIG. 2 is a perspective view of the coupler of the double-headed tent stake driver and puller of the present invention.
Figure 3:
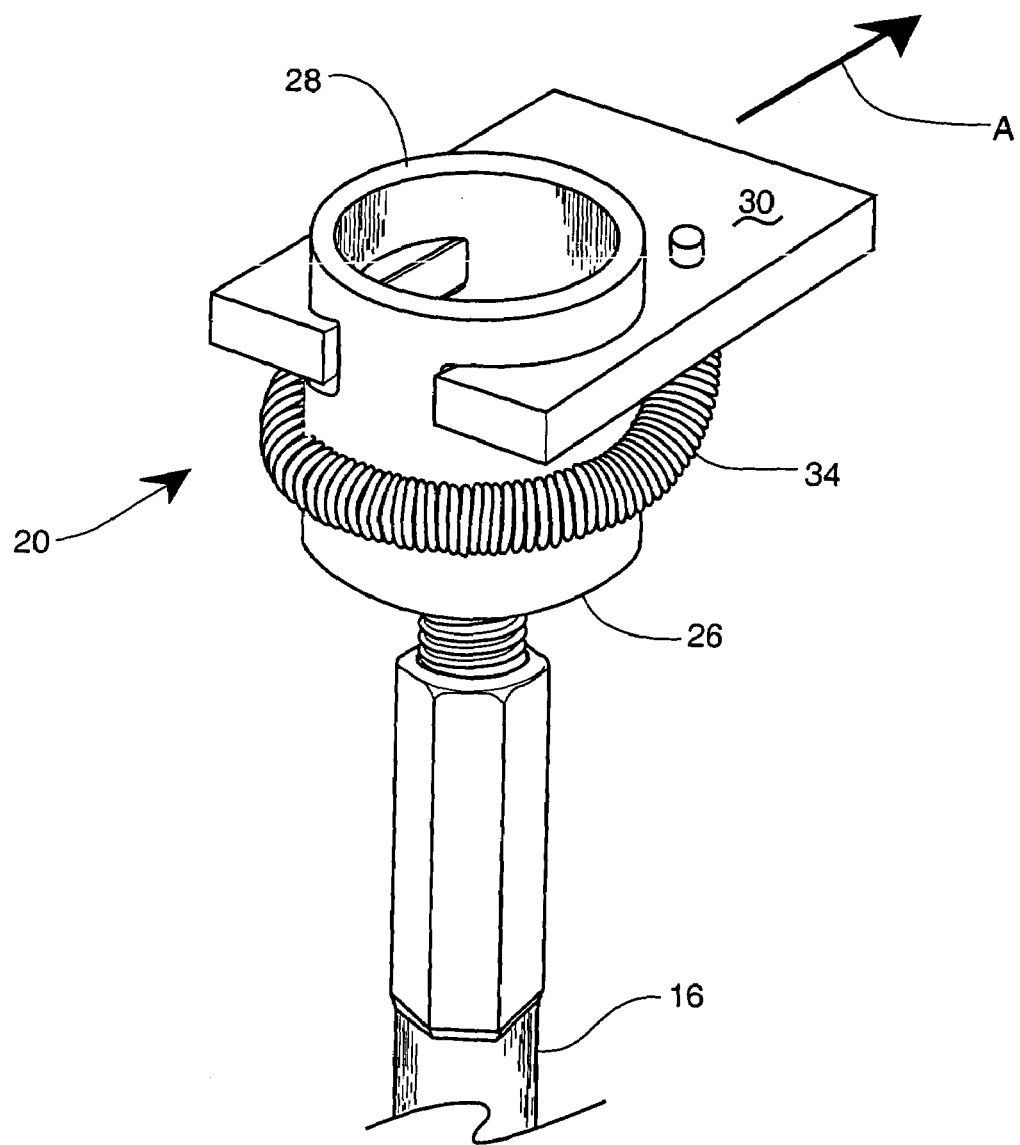
FIG. 3 is another perspective view of the coupler of the double-headed tent stake driver and puller of the present invention.

As shown in FIG. 1, the double-headed tent stake driver and puller 10 includes a slide hammer 12. The slide hammer 12 includes a weight 14 slidably mounted on a shaft 16 having an elongate portion 18 and a distal end. A coupler 20 is mounted on the distal end of the shaft 16. As shown in FIGS. 2 and 3, the coupler 20 has an axially elongate body 22 with a hollow core 24 sized to receive the head of a stake S or nail intended for use with the present invention. The coupler 20 has first and second ends designated 26 and 28 respectively. The first end 26 is closed and includes threads for attaching the coupler 20 to the shaft 16. By virtue of this threaded engagement, a variety of interchangeable couplers 20 can be readily attached to the double-headed tent stake driver and puller 10 of the present invention for use with a variety of stakes and nails. Of course, other means of attachment of the coupler 20 can be used satisfactorily, such as welding. It should also be appreciated that the coupler 20 can be utilized with other driving and pulling tools, independently of the slide hammer 12.

The second end 28 of the coupler 20 is open for receipt of the stake or nail. Advantageously and according to an important aspect of the present invention, the coupler 20 includes a retractable keeper 30 slidably received within the elongate body 22, see FIGS. 2, 3 and 5. The keeper provides the twofold benefits of retaining the stake S once inserted into the coupler 20, and presenting a surface for imparting the extraction force upon a stake to be pulled from the ground. The keeper 30 is planar and preferably constructed of metal plate of a sufficient thickness to withstand the forces exerted by the slide hammer 12 without deforming. The keeper includes a notch 31 for receiving and retaining the stake S.

The keeper 30 is slidably received within a pair of parallel grooves 32 machined in the coupler elongate body 22 as shown, for example in FIGS. 2 and 4. The grooves 32 are preferably oriented orthogonally with respect to the elongate axis E of the body 22. This, in turn, orients the keeper 30 orthogonally with respect to the elongate axis of the body 22 enabling the keeper 30 to flatly engage the heads of the stake S, maximizing contact force and minimizing any off-axis directional error. This enables a direct, linear driving and pulling motion.

The keeper 30 is urged to its closed position (shown in FIGS. 2 and 3) by a spring 34, which in the preferred embodiment, is a coil spring. The ends of the spring 34 are retained within holes 36 within the keeper 30. In use, the user pulls the keeper 30 outwardly (see the action arrow A in FIG. 3), to the open position, and the head of the stake S is inserted. When the stake S is fully inserted, the keeper 30 is released and, by virtue of the spring 34, retracts to the closed position, retaining the head of the stake S within the coupler 20. The stake S can be driven into the ground or pulled therefrom by use of the slide hammer 12. As shown in FIG. 6, the stake S is retained within the coupler 20 by the keeper 30, until positively released by the user. This assures optimum placement of each driving blow and helps prevent damage to adjacent equipment, a common problem associated with the use of sledgehammers or prybars when extracting.

In summary, numerous benefits have been described from utilizing the principles of the present invention. The double-headed tent stake driver and puller 10 of the present invention enables accurate installation and removal of double-headed tent stakes, nails and the like. The double-headed tent stake driver and puller 10 of the present invention can be used in all applications wherein stakes need to be driven and/or pulled into/from the ground, thereby avoiding use of the sledgehammer and prybar technique and its inherent limitations and difficulties. The double-headed tent stake driver and puller 10 is compact, lightweight and imparts direct, linear forces to the stake S during use, enabling the stakes S to be installed in close proximity and removed without bending.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

I claim:

1. A double-headed tent stake driver and puller, comprising:
   a slide hammer including a shaft having an elongate portion and a distal end;
   a coupler on said shaft distal end, said coupler having an axially elongate body, a first closed end, a second open end and a hollow core;
   said coupler having a pair of parallel grooves within said body disposed substantially orthogonally to the elongate axis of said body;
   a planar keeper slidably received within said grooves, said keeper being positionable between a closed and open position; and,
   a spring attached to said keeper for urging said keeper to a closed position.

2. A coupler for attachment to a driving tool, comprising:
   an axially elongate body having a first closed end and a second open end and a hollow core;
   said body having a threaded portion at said first end for attachment to the driving tool;
   said body having a pair of parallel grooves disposed substantially orthogonally to the elongate axis of said body;
   a planar keeper slidably received within said grooves, said keeper being positionable between a closed and open position; and, a spring attached to said keeper for urging said keeper to a closed position.

3. A coupler for attachment to a driving tool for driving and pulling double-headed tent stakes, comprising:

an axially elongate body having a first closed end, a second open end and a hollow core;

said body having a pair of parallel grooves within said body disposed substantially orthogonally to the elongate axis of said body;

a planar keeper slidably received within said pair of parallel grooves, said keeper being positionable between a closed and open position and having a notch for receiving the stake; and, a coil spring attached to said keeper and passing around said body for urging said keeper to a closed position.

4. A double-headed tent stake driver and puller, comprising:

a slide hammer including a shaft having an elongate portion and a distal end;

a coupler on said shaft distal end, said coupler having an axially elongate body, a first closed end, a second open end and a hollow core;

said coupler further having a pair of parallel grooves within said body disposed substantially orthogonally to the elongate axis of said body;

a planar keeper slidably received within said pair of parallel grooves, said keeper being positionable between a closed and open position and having a notch for receiving the stake; and, a coil spring attached to said keeper and passing around said body for urging said keeper to a closed position.

* * * * *